(12) United States Patent
Daye et al.

(10) Patent No.: US 8,700,401 B2
(45) Date of Patent: Apr. 15, 2014

(54) ADAPTIVE VOICE PRINT FOR CONVERSATIONAL BIOMETRIC ENGINE

(71) Applicant: Nuance Communications, Inc., Burlington, MA (US)

(72) Inventors: Sheri G Daye, Boca Raton, FL (US); Peeyush Jaiswal, Boca Raton, FL (US); Fang Wang, Plano, TX (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/770,537

(22) Filed: Feb. 19, 2013

(65) Prior Publication Data

US 2013/0166301 A1    Jun. 27, 2013

Related U.S. Application Data

(63) Continuation of application No. 12/702,512, filed on Feb. 9, 2010, now Pat. No. 8,417,525.

(51) Int. Cl.
*G10L 17/00* (2013.01)
*G10L 17/04* (2013.01)
*G10L 17/20* (2013.01)

(52) U.S. Cl.
CPC ............... *G10L 17/04* (2013.01); *G10L 17/00* (2013.01); *G10L 17/20* (2013.01)
USPC ............................................................ 704/246

(58) Field of Classification Search
CPC .......... G10L 17/00; G10L 17/04; G10L 17/20
USPC ................................................. 704/246–250
See application file for complete search history.

(56) References Cited

U.S. PATENT DOCUMENTS

| 3,983,535 | A | * | 9/1976 | Herbst et al. | 382/122 |
| 5,210,874 | A | * | 5/1993 | Karger | 719/328 |
| 5,897,616 | A | * | 4/1999 | Kanevsky et al. | 704/246 |
| 5,915,973 | A | * | 6/1999 | Hoehn-Saric et al. | 434/350 |
| 6,161,090 | A | * | 12/2000 | Kanevsky et al. | 704/246 |
| 6,480,825 | B1 | | 11/2002 | Sharma et al. | |
| 6,751,590 | B1 | | 6/2004 | Chaudhari et al. | |
| 6,760,701 | B2 | | 7/2004 | Sharma et al. | |

(Continued)

OTHER PUBLICATIONS

Yang et al., "Biometric Education With Hands-On Labs," ACM Southeast Conference '08, ACM, 2008, pp. 18-23.

(Continued)

*Primary Examiner* — Douglas Godbold
(74) *Attorney, Agent, or Firm* — Hamilton, Brook, Smith & Reynolds, P.C.

(57) ABSTRACT

A computer-implemented method, system and/or program product update voice prints over time. A receiving computer receives an initial voice print. A determining period of time is calculated for that initial voice print. This determining period of time is a length of time during which an expected degree of change in subsequent voice prints, in comparison to the initial voice print and according to a speaker's subsequent age, is predicted to occur. A new voice print is received after the determining period of time has passed, and the new voice print is compared with the initial voice print. In response to a change to the new voice print falling within the expected degree of change in comparison to the initial voice print, a voice print store is updated with the new voice print.

19 Claims, 4 Drawing Sheets

(56) References Cited

U.S. PATENT DOCUMENTS

| | | | |
|---|---|---|---|
| 7,237,717 B1* | 7/2007 | Rao et al. | 235/386 |
| 7,512,221 B2* | 3/2009 | Toms | 379/114.14 |
| 7,822,605 B2* | 10/2010 | Zigel et al. | 704/246 |
| 8,141,134 B2* | 3/2012 | Brandt et al. | 726/4 |
| 8,417,525 B2 | 4/2013 | Daye et al. | |
| 2002/0133502 A1* | 9/2002 | Rosenthal et al. | 707/104.1 |
| 2004/0029567 A1* | 2/2004 | Timmins et al. | 455/412.1 |
| 2004/0181675 A1* | 9/2004 | Hansen | 713/182 |
| 2004/0186724 A1* | 9/2004 | Morin | 704/273 |
| 2004/0230536 A1* | 11/2004 | Fung et al. | 705/64 |
| 2005/0058262 A1 | 3/2005 | Timmins et al. | |
| 2005/0185779 A1* | 8/2005 | Toms | 379/114.14 |
| 2007/0169182 A1 | 7/2007 | Wolfond et al. | |
| 2008/0077482 A1* | 3/2008 | Tota et al. | 705/10 |
| 2008/0195387 A1* | 8/2008 | Zigel et al. | 704/236 |
| 2008/0212846 A1 | 9/2008 | Yamamoto et al. | |
| 2011/0196676 A1 | 8/2011 | Daye et al. | |

OTHER PUBLICATIONS

Jain et al., "Multibiometric Systems," Communications of the ACM, Jan. 2004, vol. 47, No. 1, pp. 34-40.

Navratil et al., "An Instantiable Speech Biometrics Module With Natural Language Interface: Implementation in the Telephony Environment," IEEE, 2000, pp. 1097-1100.

Li et al., "Combining Voiceprint and Face Biometrics for Speaker Identification Using SDWS," 9th European Conference on Speech Communication and Technology, International Speech and Communication Association, Dec. 1, 2005, Abstract.

Maes et al., "Conversational Speech Biometrics," Springer-Verlag, Berlin, Germany, E-commerce Agents, Marketplace Solutions, Security Issues, and Supply and Demand, 2001, Abstract.

U.S. Appl. No. 12/702,512, Non-Final Office Action Mailed Aug. 10, 2012.

* cited by examiner

ADAPTIVE VOICE PRINT FOR CONVERSATIONAL BIOMETRIC ENGINE

The present application is a continuation of U.S. patent application Ser. No. 12/702,512, filed on Feb. 9, 2010, and titled, "Adaptive Voice Print for Conversational Biometric Engine," which is incorporated herein by reference.

BACKGROUND

The present disclosure relates to the field of computers, and specifically to computer systems. Still more particularly, the present disclosure relates to voice prints that are processed by computer systems.

SUMMARY

A computer-implemented method, system and/or program product update voice prints over time. A receiving computer receives an initial voice print. A determining period of time is calculated for that initial voice print. This determining period of time is a length of time during which an expected degree of change in subsequent voice prints, in comparison to the initial voice print and according to a speaker's subsequent age, is predicted to occur. A new voice print is received after the determining period of time has passed, and the new voice print is compared with the initial voice print. In response to a change to the new voice print falling within the expected degree of change in comparison to the initial voice print, a voice print store is updated with the new voice print.

DETAILED DESCRIPTION

Figure 1:
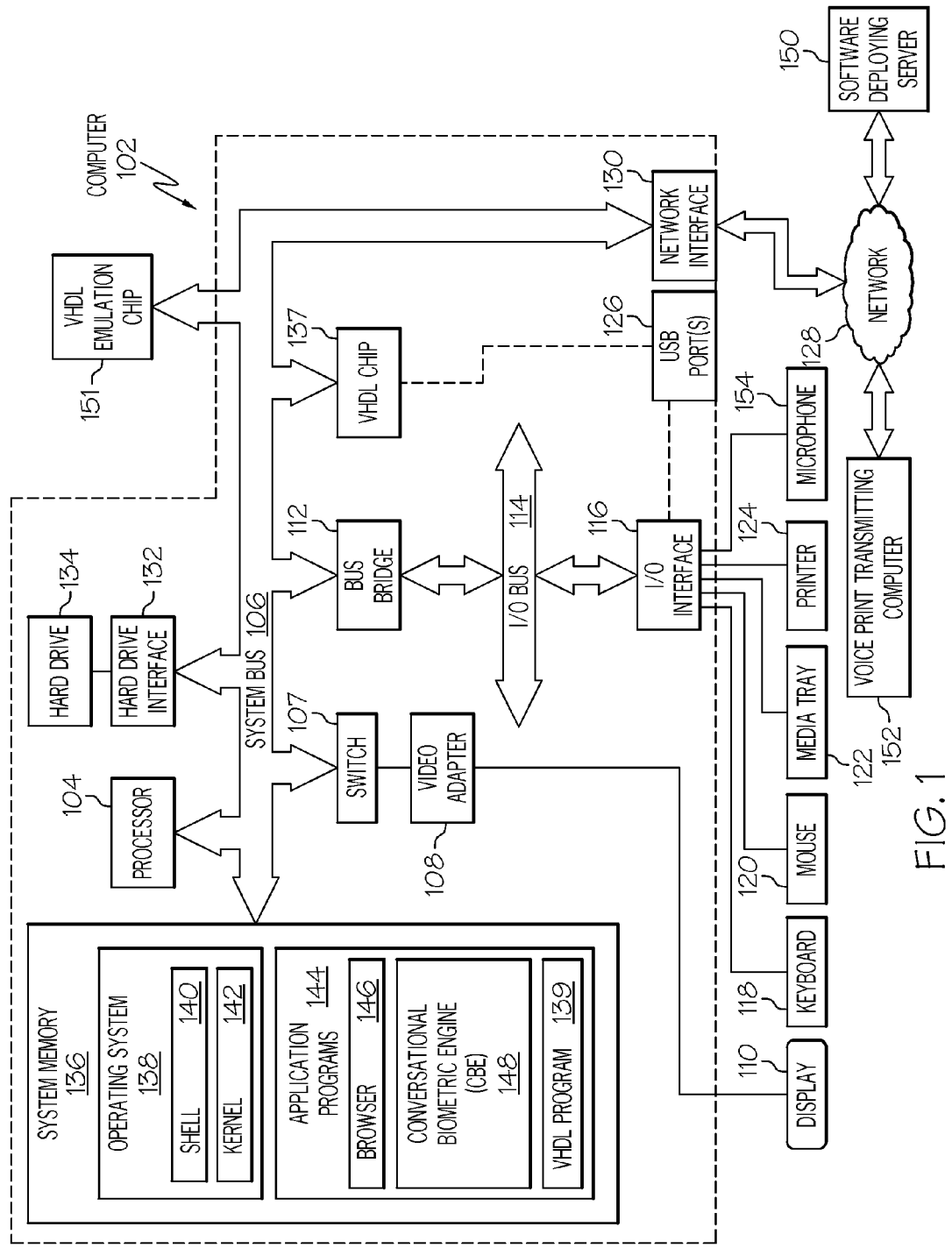
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150 and/or voice transmitting computer 152.

Computer 102 includes a processor 104 that is coupled to a system bus 106. Processor 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., conversational biometric engine—CBE 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a conversational biometric engine (CBE) 148. CBE 148 includes code for implementing the processes described below, including those described in FIGS. 2-3. In one embodiment, computer 102 is able to download CBE 148 from software deploying server 150, including in an on-demand basis, wherein the code in CBE 148 is not downloaded until needed for execution to define and/or implement the improved enterprise architecture described herein. Note further that, in one embodiment of the present invention, software deploying server 150 performs all of the functions associated with the present invention (including execution of CBE 148), thus freeing computer 102 from having to use its own internal computing resources to execute CBE 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from CBE 148 causes VHDL program 139 to configure VHDL chip 137, which may be an FPGA, ASIC, etc.

In another embodiment of the present invention, execution of instructions from CBE 148 results in a utilization of VHDL program 139 to program a VHDL emulation chip 151. VHDL emulation chip 151 may incorporate a similar architecture as described above for VHDL chip 137. Once CBE 148 and VHDL program 139 program VHDL emulation chip 151, VHDL emulation chip 151 performs, as hardware, some or all functions described by one or more executions of some or all of the instructions found in CBE 148. That is, the VHDL emulation chip 151 is a hardware emulation of some or all of the software instructions found in CBE 148. In one embodiment, VHDL emulation chip 151 is a programmable read only memory (PROM) that, once burned in accordance with instructions from CBE 148 and VHDL program 139, is permanently transformed into a new circuitry that performs the functions needed to perform the process described below in FIGS. 2-3.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like.

These and other variations are intended to be within the spirit and scope of the present invention.

As described in detail below, the present disclosure describes a method to adapt voice prints in a conversational biometric engine to reflect gradual changes to a speaker's voice. Instead of using a single voice print, one or more voice prints for the same speaker are maintained chronologically. In one embodiment, the process evaluates multiple voice prints (on the background) and trims the voice print model as needed. At the same time, the process employs an algorithm to make sure legible changes on speaker's voice are picked up while the short term/sudden changes are ignored. As described herein, an adaptive conversational biometric engine adapts to the speaker's voice changes in a long term trend while ignoring any short term effects, such that a robust speaker verification is enabled with few or no speaker re-enrollment processes.

As is understood by those skilled in the art, a voice print is defined as a mathematically described set of speech characteristics of a human voice. Each human voice is aurally distinct, being affected by a human speaker's tongue, lips, breath, vocal cords, etc. The set of speech characteristics includes, but is not limited to, frequency or pitch (how "high" or "low" the voice is), speed (how "fast" a user talks), word pronunciation (affected by regional accents, speech defects, etc.), dialect (e.g., using a word or phrase that is characteristic of a particular language dialect, region of a state or country, etc.), etc. By taking a digitized "snapshot" of a set of voice data (particularly that for a known word or phrase), known techniques such as fast Fourier transforms (FFTs) etc. can create a unique description of a particular person's voice. This unique description (voice print) can then be used to authenticate the identity of a person.

Figure 2:
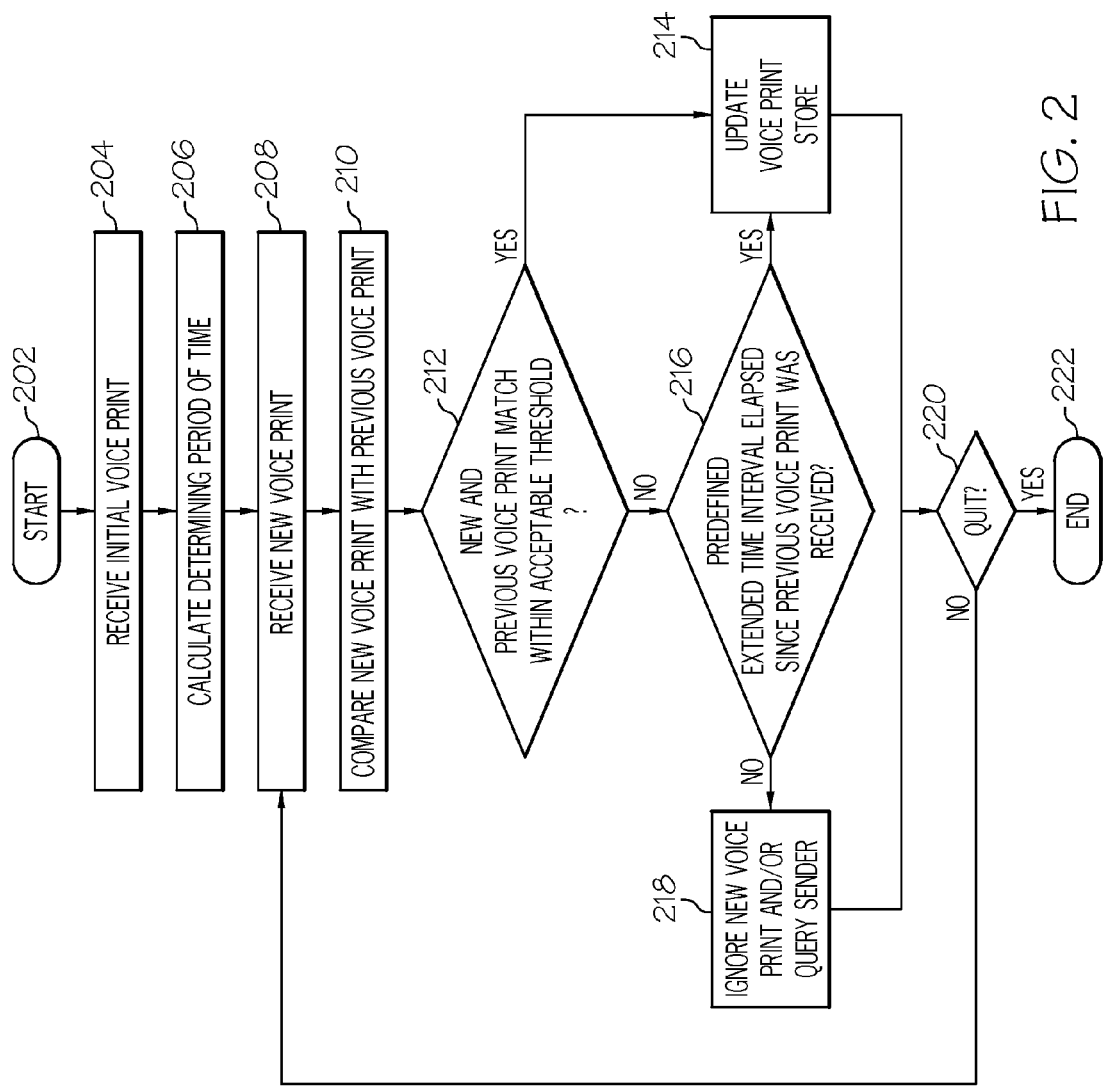
FIG. 2 is a high-level flow chart of exemplary steps taken in accordance with the present disclosure to update voice prints over time.

With reference now to FIG. 2, a high level flow chart of exemplary steps taken to update voice prints over time is presented. After initiator block 202, an initial voice print is received (block 204). For example, computer 102, shown above in FIG. 1, may receive voice data and/or a voice print from the voice transmitting computer 152. Voice transmitting computer 152 may be a voice over internet protocol (VoIP) enabled computer, which permits digitized voice data (i.e., human speech) to be transmitted to computer 102. Alternatively, this human speech can be transmitted over any other type of voice-carrying device (not shown), including a cell phone, a plain old telephone system (POTS) phone, etc. to computer 102. In either scenario, computer 102 will generate a voice print from the received human speech. Alternatively, voice transmitting computer 152 can actually generate the voice print of the human speech. For purposes of clarity, therefore, it is understood that computer 102 is receiving a voice print whether computer 102 or voice transmitting computer 152 actually performs the act of generating the voice print from the human speech.

Note that while the voice data or voice print is described above as being received from a remote location, the present disclosure is also relevant to voice data being received locally. For example, assume that computer 102 shown in FIG. 1 also has a microphone 154 attached to I/O interface 116. A local user of computer 102 can speak into microphone 154, thus providing computer 102 with voice data that is processed into a voice print, using CBE 148. This voice print can then be used to authorize that user to access software and/or hardware resources provided by computer 102.

Returning now to FIG. 2, a determining period of time, which is preferably specific for the initial voice print, is then calculated (block 206). This determining period of time is a length of time during which an expected degree of change is predicted to occur in subsequent voice prints in comparison to the initial voice print. Factors which influence this prediction include, but are not limited to, current age of the speaker, quality of the initial voice print and/or voice data, etc. For example, assume that the speaker is an early-adolescent male. The voice of such a speaker may be assumed to change in pitch substantially over the course of just a few years, while such a change in pitch would not be expected in a more mature adult. Thus, a substantial change to a subsequently received voice data from this early-adolescent male can be expected, such that the new resulting voice print would be substantially different from the initial (original) voice print. Similarly, if the initial voice data was of a poor quality (due to known high levels of background noise, static, etc.), then a subsequently transmitted voice data would be expected to be clearer, and thus result in a substantially different voice print.

As described in block 208, a new voice print is then received. In one embodiment, this new voice print is received after the determining period of time has passed. In one embodiment, if the determining period of time has not passed since the initial voice print (or other previous voice print) was received, then the new voice print is simply ignored and/or discarded. As with the initial voice print described above, while an actual new voice print may be received, receiving new voice data (i.e., a human voice being transmitted locally via a microphone or remotely from a phone, telephonically-enabled computer, etc.) and then converting that new voice data into a new voice print is conceptually considered to be a same event as receiving a new voice print. This new voice print is compared with the previously received initial voice print (block 210). A determination is then made as to whether the new voice print falls within the expected degree of change in comparison to the previously received initial voice print (query block 212). That is, a determination is made as to whether the set of speech characteristics described above for the person providing the voice data has changed beyond a predetermined level. For example, consider the voice prints V(1-$n$), where "$n$" is an integer, shown in the graph 300 of FIG. 3. Voice print V(1) is the initial voice print for a speaker, and has been given a score of "50" as quantified values for the set of speech characteristics (tone, accent, timber, pace, pitch, resonance, etc.) of that speaker's voice. After the determining period of time described above has passed (e.g., one year), a second voiced print V(2) for that same speaker is received. The score for V(2) is "48," indicating that there has been a slight change in the voice print as compared with the voice print V(1). That is, whenever a trait/characteristic/measurement from V(1) does not accurately match that of V(2), the score of V(2) is reduced. In the case of V(2), two points have been deducted due to the difference between the speech characteristics measured for V(1) and V(2). Assume now that any change of less than three points is acceptable, since that falls within the expected degree of change that has been predicted to occur after the passage of the predetermined period of time discussed above.

Figure 3:
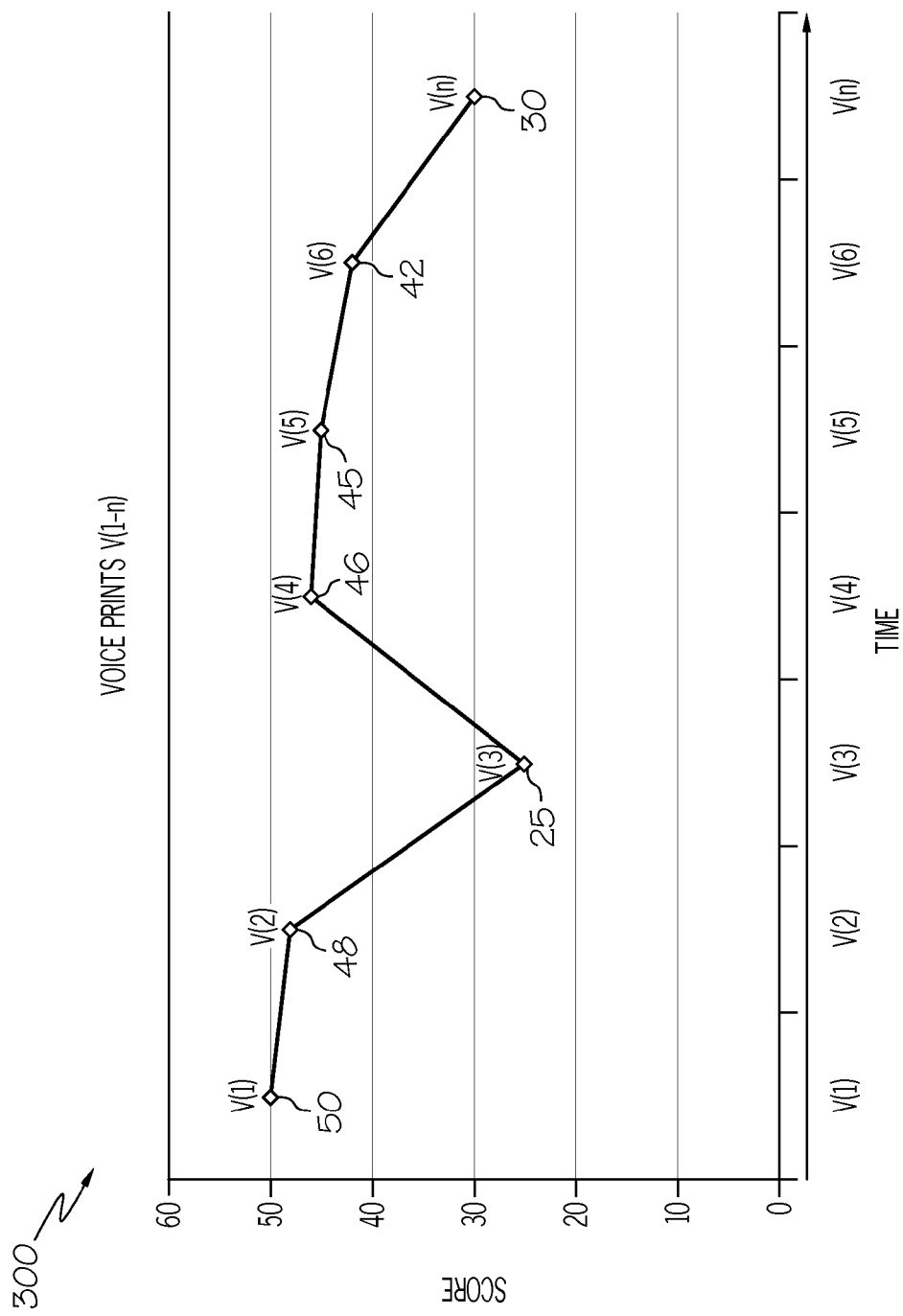
FIG. 3 is a chart of score changes for multiple voice prints received over time.

Returning now to FIG. 2, if the new voice print match a previous voice print within the expected level of change (as is the case for voice print V(2) when compared to voice print V(1) shown in FIG. 3), then a voice print store is updated with the new voice print (i.e., V(2)), as described in block 214. Updating the voice print store can be performed in various ways. In one embodiment, the new voice print simply replaces the older (e.g., the initial) voice print, such that the voice print store only contains a single (latest) voice print. In another embodiment, a predetermined number, which may be all or less than all, of past voice prints are averaged together, such that an amalgamated voice print is created. In this another embodiment then, updating the voice print store is performed by creating an amalgamated voice print by averaging parameters used to define the initial and subsequent (e.g., new) voice prints.

With reference now to query block 216, assume that the new and previous voice prints did not match closely enough. A query is then made as to whether a predefined extended period of time has elapsed since the previous voice print was received. If so, then the voice print store will be updated even though the new and previous voice prints did not match closely enough (in accordance with parameters set by the expected degree of change). That is, even though the new and previous voice prints are greatly different (e.g., having a change of ten points, which is more than the three points permitted above), more latitude is given since a long period of time has elapsed since the previous voice print was received. Thus, a new degree of change (e.g., a seven point drop from the previous voice print score) is acceptable if the predefined extended period of time has passed since the previous voice print was received/generated.

Referring again to FIG. 3, consider now voice print V(3), which has been taken after the predetermined period of time (but not the predefined extended period of time) has elapsed since taking/receiving voice print V(2), and has been given a score of "25," indicating a drop of 23 points from the score for voice print V(2). Since 23 is well beyond the acceptable drop of three points, and since the predefined extended time interval has not elapsed since voice print V(2) was received, voice print V(3) is ignored, as described in block 218 in FIG. 2. By ignoring voice print V(3), several results occur. First, the voice print store is not updated with voice print V(3). Second, voice print V(3) is not used for comparison by a subsequent voice print (e.g., voice print V(4) shown in FIG. 3). Rather, the subsequent voice print (e.g., V(4)) is compared to the earlier voice print (i.e., V(2)) rather than the ignored voice print (i.e., V(3)). As suggested by block 218, additional security questions (e.g., questions having answers that have been previously user-programmed) can be presented to the speaker of the voice data if the voice print fails to meet the criteria described above.

With reference now to query block 220, the process continues until a decision to quit is reached. This decision may occur after a predetermined number of voice prints have been received, a predetermined amount of time has passed since receiving the initial voice print, etc. The process ends at terminator block 222.

Returning again to FIG. 3, note that voice prints V(4)-V(n) each occur after the passage of the determining period of time described above. If any voice print has occurred before this determining period of time had elapsed (since receipt of the immediately preceding voice print), then that voice print (which was received too soon after the immediately preceding voice print) would simply be ignored, thus prohibiting the updating of the voice print store with that new voice print. In the case of voice prints V(4)-V(n), however, the time criteria have been satisfied. As described above, voice print V(4) is compared to voice print V(2) (not voice print V(3)). Since there is only a two point drop in the score from voice print V(2) and voice print V(4), then voice print V(4) is used to update the voice print store. Voice prints V(5) and V(6) likewise fall below the maximum allowable scoring drop (one point drop from V(4) to V(5) and a three point drop from V(5) to V(6)), and thus are used to update the voice print store. However, voice print V(n) falls 12 points. Assuming that the time period from when voice print V(6) was received does not reach the predefined extended period of time described above, voice print V(n) is ignored just as voice print V(3) was ignored.

Figure 4:
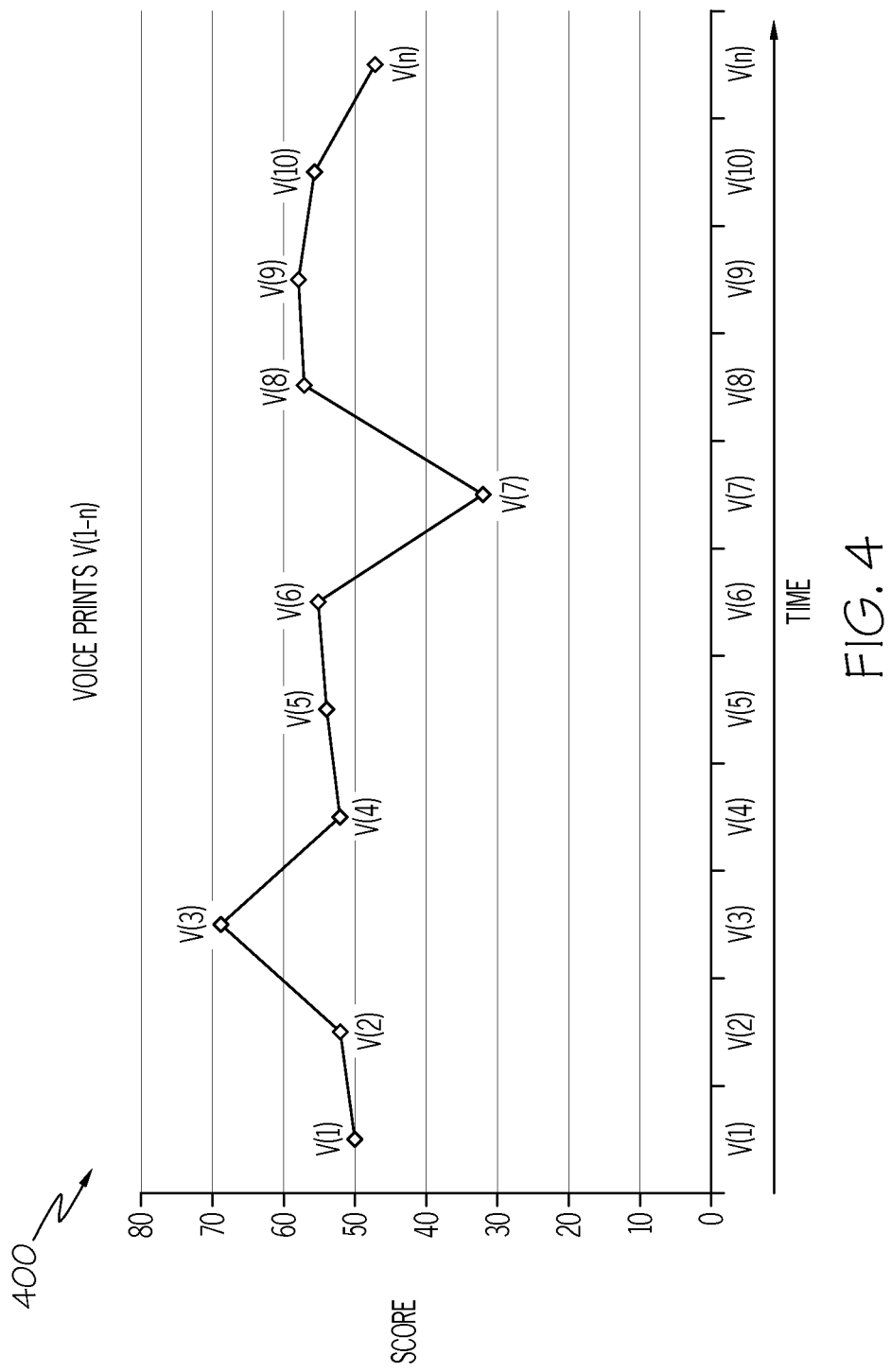
FIG. 4 is a chart of voice prints used in a rolling average to grade subsequently received new voice prints.

While the process for adapting voice prints has been described above with reference to degradation of subsequent voice prints from the initial voice print, the process described herein should be understood as a continual improvement process, in which each subsequently received voice print is trusted to conform with an expected long-term change for the voice print of a single speaker. The process described in FIG. 3 has the advantage of requiring only a single previous voice print to grade a successive voice print. In another embodiment, however, this grading is performed by comparing a current (new) voice print with a rolling average of multiple previous voice prints. For example, consider the graph 400 shown in FIG. 4. By having a history of prior voice prints, a modified rolling average can be calculated. This calculated modified rolling average is then used to determine if a newly received voice print conforms to expected long-term changes, rather than short-term anomalies, associated with a single speaker's voice.

Consider, for example, voice print V(6), which has a score of 55.0 (which is a numerical evaluation of various voice quality characteristics, such as those described above). Voice prints V(1-5) have respective scores of 50, 52, 69, 52 and 54, giving them an average score of 55.4, which is close to the score of 55.0 for voice print V(6). With this comparison, voice print V(6) would be a proper candidate for updating the voice print store described above. However, it is apparent that voice print V(3) is an anomaly, since it has a score of 69. By taking the score for V(3) out of the rolling average, then the average score of the remaining pool of previous voice prints V(1-2 and 4-5) becomes 52.0, making voice print V(6) suspect. Thus, voice print V(6) should be treated in a manner described above, to include being ignored, prompting additional security questions, being prohibited from updating the voice print store, etc.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method of updating voice prints over time, the method comprising:
   receiving, by one or more processors, an initial voice print;
   calculating, by one or more processors, a determining period of time, wherein the determining period of time is a length of time during which an expected degree of change to a subsequent voice print is predicted to occur in comparison to the initial voice print, and wherein the determining period of time is calculated according to an age of a person whose voice provides a basis for the initial voice print;
   receiving, by one or more processors, a new voice print after the determining period of time;
   comparing, by one or more processors, the new voice print with the initial voice print; and
   in response to a change to the new voice print falling within the expected degree of change in comparison to the initial voice print, updating, by one or more processors, a voice print store with the new voice print.

2. The method of claim 1, further comprising:
   in response to a change to the new voice print falling outside the expected degree of change in comparison to the initial voice print, ignoring the new voice print.

3. The method of claim 2, wherein ignoring the new voice print comprises prohibiting an updating of the voice print store with the new voice print.

4. The processor-implemented method of claim 2, wherein ignoring the new voice print comprises presenting additional security questions to a sender of the new voice print.

5. The method of claim 2, further comprising:
   receiving, by one or more processors, a subsequent voice print; and
   comparing, by one or more processors, the subsequent voice print with the initial voice print rather than the new voice print that is being ignored due to falling outside the expected degree of change in comparison to the initial voice print.

6. The method of claim 1, further comprising:
   in response to a predefined extended period of time passing between receiving the initial voice print and the new voice print, updating, by one or more processors, the voice print store with the new voice print, wherein the predefined extended period of time is an extended period of time during which the change to the new voice print is predicted to fall outside the expected degree of change in comparison to the initial voice print.

7. The method of claim 1, wherein said updating the voice print store is performed by creating an amalgamated voice print by averaging parameters used to define the initial and new voice prints.

8. The method of claim 1, wherein said updating the voice print store is performed by replacing the initial voice print with the new voice print.

9. The method of claim 1, further comprising:
   prohibiting, by one or more processors, an updating of the voice print store with any subsequent voice print that is received before passage of the determining period of time after the initial voice print was received.

10. A computer system comprising:
    a central processing unit (CPU), a computer readable memory, and a computer readable storage media;
    first program instructions to receive an initial voice print;
    second program instructions to calculate a determining period of time, wherein the determining period of time is a length of time during which an expected degree of change to a subsequent voice print is predicted to occur in comparison to the initial voice print, and wherein the determining period of time is calculated according to an age of a person whose voice provides a basis for the initial voice print;
    third program instructions to receive a new voice print after the determining period of time;
    fourth program instructions to compare the new voice print with the initial voice print; and
    fifth program instructions to, in response to a change to the new voice print falling within the expected degree of change in comparison to the initial voice print, update a voice print store with the new voice print; and wherein
    the first, second, third, fourth and fifth program instructions are stored on the computer readable storage media for execution by the CPU via the computer readable memory.

11. The computer system of claim 10, further comprising:
    sixth program instructions to, in response to a change to the new voice print falling outside the expected degree of change in comparison to the initial voice print, ignore the new voice print, wherein the sixth program instructions are stored on the computer readable storage media for execution by the CPU via the computer readable memory.

12. The computer system of claim 11, wherein ignoring the new voice print comprises prohibiting an updating of the voice print store with the new voice print.

13. The computer system of claim 11, wherein ignoring the new voice print comprises presenting additional security questions to a sender of the new voice print.

14. The computer system of claim 11, further comprising:
    seventh program instructions to receive a subsequent voice print; and eighth program instructions to compare the subsequent voice print with the initial voice print rather than the new voice print that is being ignored due to falling outside the expected degree of change in comparison to the initial voice print, wherein the seventh and eighth program instructions are stored on the computer readable storage media for execution by the CPU via the computer readable memory.

15. A computer program product for updating voice prints over time, the computer program product comprising:
   a computer readable storage media;
   first program instructions to receive an initial voice print;
   second program instructions to calculate a determining period of time, wherein the determining period of time is a length of time during which an expected degree of change to a subsequent voice print is predicted to occur in comparison to the initial voice print, and wherein the determining period of time is calculated according to an age of a person whose voice provides a basis for the initial voice print;
   third program instructions to receive a new voice print after the determining period of time;
   fourth program instructions to compare the new voice print with the initial voice print; and
   fifth program instructions to, in response to a change to the new voice print falling within the expected degree of change in comparison to the initial voice print, update a voice print store with the new voice print; and wherein the first, second, third, fourth, and fifth program instructions are stored on the computer readable storage media.

16. The computer program product of claim 15, further comprising:
   sixth program instructions to, in response to a change to the new voice print falling outside the expected degree of change in comparison to the initial voice print, ignore the new voice print, wherein the sixth program instructions are stored on the computer readable storage media.

17. The computer program product of claim 15, wherein ignoring the new voice print comprises prohibiting an updating of the voice print store with the new voice print.

18. The computer program product of claim 15, wherein ignoring the new voice print comprises presenting additional security questions to a sender of the new voice print.

19. The computer program product of claim 15, wherein the first, second, third, fourth and fifth program instructions are provided by a service provider to a customer in an on-demand basis.

* * * * *